United States Patent
Fang et al.

(10) Patent No.: US 12,516,657 B2
(45) Date of Patent: Jan. 6, 2026

(54) METHOD, APPARATUS, ELECTRONIC DEVICE FOR MONITORING TOWER CLEARANCE

(71) Applicant: GOLDWIND SCIENCE & TECHNOLOGY CO., LTD., Xinjiang (CN)

(72) Inventors: Haitao Fang, Beijing (CN); Xiangnan Li, Beijing (CN); Qi Zhang, Beijing (CN); Wenlei Zhang, Beijing (CN)

(73) Assignee: GOLDWIND SCIENCE & TECHNOLOGY CO., LTD., Xinjiang (CN)

( * ) Notice: Subject to any disclaimer, the term of this patent is extended or adjusted under 35 U.S.C. 154(b) by 0 days.

(21) Appl. No.: 18/293,457

(22) PCT Filed: Mar. 14, 2022

(86) PCT No.: PCT/CN2022/080643
§ 371 (c)(1),
(2) Date: Jan. 30, 2024

(87) PCT Pub. No.: WO2023/123684
PCT Pub. Date: Jul. 6, 2023

(65) Prior Publication Data
US 2025/0116254 A1    Apr. 10, 2025

(30) Foreign Application Priority Data
Dec. 31, 2021  (CN) .......................... 202111676458.5

(51) Int. Cl.
*F03D 7/02* (2006.01)
*F03D 17/00* (2016.01)
(Continued)

(52) U.S. Cl.
CPC ......... *F03D 7/0264* (2013.01); *F03D 7/0224* (2013.01); *F03D 17/003* (2023.08);
(Continued)

(58) Field of Classification Search
CPC .... F03D 7/0264; F03D 7/0224; F03D 17/003; F03D 17/012; F03D 13/20; F03D 17/00; F03D 80/00
See application file for complete search history.

(56) References Cited

U.S. PATENT DOCUMENTS

| | | | |
|---|---|---|---|
| 8,242,476 B2* | 8/2012 | Mimeault | G01S 7/4814 250/221 |
| 2004/0057828 A1* | 3/2004 | Bosche | F03D 7/046 416/31 |

(Continued)

FOREIGN PATENT DOCUMENTS

| CN | 203604116 U | 5/2014 |
|---|---|---|
| CN | 105545593 A | 5/2016 |

(Continued)

OTHER PUBLICATIONS

The International Search Report mailed Sep. 26, 2022; PCT/CN2022/080643.
(Continued)

*Primary Examiner* — J. Todd Newton
(74) *Attorney, Agent, or Firm* — Frank Gao, Esq.

(57) ABSTRACT

The application provides a method, apparatus and electronic device for monitoring tower clearance. The method for monitoring tower clearance includes: obtaining a distance to an obstacle measured by a laser ranging device; calculating a measured clearance value of each laser based on a first distance of the laser; compensating the measured clearance value of each laser by a preset compensation formula to obtain a compensated clearance value of the laser; compar- (Continued)

ing a minimum compensated clearance value among N lasers with a preset clearance threshold; and performing safety protection for the wind turbine based on a comparison result.

13 Claims, 12 Drawing Sheets

(51) Int. Cl.
  *G01S 7/481* (2006.01)
  *G01S 17/08* (2006.01)
(52) U.S. Cl.
  CPC .......... *F03D 17/012* (2023.08); *G01S 7/4815* (2013.01); *G01S 17/08* (2013.01); *F05B 2270/328* (2013.01); *F05B 2270/804* (2013.01)

(56) References Cited

U.S. PATENT DOCUMENTS

| | | | |
|---|---|---|---|
| 2008/0316464 A1* | 12/2008 | Luo | G01S 7/4873 356/5.01 |
| 2011/0090514 A1 | 4/2011 | Robinson et al. | |
| 2011/0135466 A1* | 6/2011 | Latorre | F03D 17/00 416/61 |
| 2018/0171984 A1* | 6/2018 | David | F03D 17/00 |
| 2020/0362826 A1* | 11/2020 | David | F03D 7/0236 |
| 2022/0235742 A1* | 7/2022 | David | F03D 17/00 |

FOREIGN PATENT DOCUMENTS

| | | | | |
|---|---|---|---|---|
| CN | 109812390 A | 5/2019 | | |
| CN | 109826760 A | 5/2019 | | |
| CN | 110005581 A | 7/2019 | | |
| CN | 110454334 A | 11/2019 | | |
| CN | 111980872 A | 11/2020 | | |
| CN | 112267980 A | 1/2021 | | |
| CN | 112539707 A | 3/2021 | | |
| CN | 111878319 B | 7/2021 | | |
| CN | 113153656 A | 7/2021 | | |
| CN | 113153658 A | 7/2021 | | |
| CN | 113217300 A | 8/2021 | | |
| CN | 113357082 A | 9/2021 | | |
| CN | 113586356 A | 11/2021 | | |
| CN | 113586367 A | 11/2021 | | |
| CN | 113757051 A | 12/2021 | | |
| EP | 2402603 B1 | * | 5/2015 | .......... F03D 1/0675 |
| WO | WO-2019110624 A1 | * | 6/2019 | .......... F03D 1/0633 |

OTHER PUBLICATIONS

The Extended European Search Report dated Nov. 8, 2024; Appln. No. 22912990.3.
The First Chinese Office Action dated Jun. 20, 2025; Appln. No. 202111676458.5.

* cited by examiner

METHOD, APPARATUS, ELECTRONIC DEVICE FOR MONITORING TOWER CLEARANCE

CROSS-REFERENCE TO RELATED APPLICATIONS

This application is a National Stage of International Application No. PCT/CN2022/080643, filed on Mar. 14, 2022, which claims priority to Chinese Patent Application No. 202111676458.5, titled "METHOD, APPARATUS, ELECTRONIC DEVICE FOR MONITORING TOWER CLEARANCE" and filed on Dec. 31, 2021, both of which are hereby incorporated by reference in their entireties.

TECHNICAL FIELD

The application relates to the field of monitor technologies, and more particularly to a method, an apparatus and an electronic device for monitoring tower clearance.

BACKGROUND

The current tower clearance monitoring technology mainly monitors clearance through cameras, lasers or other sensors. When monitoring by cameras, image processing technology is required, and the computing time of image processing is long, and the monitoring is not timely enough. In a technical solution of monitoring by laser in related technologies, due to directionality of the laser, the measured clearance value is not accurate enough, which affects the monitoring effect.

SUMMARY

The embodiments of the application provide a method, an apparatus and an electronic device for monitoring tower clearance The embodiment according to a first aspect of the application provides a method for monitoring tower clearance, including: obtaining a distance to an obstacle measured by a laser ranging device, wherein the laser ranging device is mounted eccentrically at a bottom of a nacelle of a wind turbine, and the laser ranging device is configured to emit N lasers at different fixed angles toward a blade tip plane, and measure the distance to the obstacle by the lasers to obtain a first distance measured by each laser, wherein N is a positive integer greater than one; calculating a measured clearance value of each laser based on the first distance of the laser; compensating the measured clearance value of each laser by a preset compensation formula to obtain a compensated clearance value of the laser; comparing a minimum compensated clearance value among the N lasers with a preset clearance threshold; and performing safety protection for the wind turbine based on a comparison result.

The embodiment according to a second aspect of the application provides an apparatus for monitoring tower clearance, including: a first obtaining unit configured to obtain a distance to an obstacle measured by a laser ranging device, wherein the laser ranging device is mounted eccentrically at a bottom of a nacelle of a wind turbine, and the laser ranging device is configured to emit N lasers at different fixed angles toward a blade tip plane, and measure the distance to the obstacle by the lasers to obtain a first distance measured by each laser, wherein N is a positive integer greater than one; a first calculation unit configured to calculate a measured clearance value of each laser based on the first distance of the laser; a compensation unit configured to compensate the measured clearance value of each laser by a preset compensation formula to obtain a compensated clearance value of the laser; a comparison unit configured to compare a minimum compensated clearance value among the N lasers with a preset clearance threshold; and a safety protection unit configured to perform safety protection for the wind turbine based on a comparison result.

The embodiment according to a third aspect of the application provides an electronic device, including: a processor, and a memory storing program instructions, wherein the processor, when executing the program instructions, implements the method for monitoring tower clearance provided by the embodiment according to the first aspect of the application.

The embodiment according to a fourth aspect of the application provides a system for monitoring power clearance, including: a laser ranging device mounted eccentrically at a bottom of a nacelle of a wind turbine, and configured to emit N lasers at different fixed angles toward a blade tip plane, and measure a distance to an obstacle by the lasers to obtain a first distance measured by each laser, wherein N is a positive integer greater than one; and an electronic device including the apparatus for monitoring tower clearance provided by the embodiment according to the second aspect of the application.

The embodiment according to a fifth aspect of the application provides a readable storage medium having program instructions stored thereon, wherein the program instructions, when executed by a processor, implement the method for monitoring tower clearance provided by the embodiment according to the first aspect of the application.

The embodiment according to a sixth aspect of the application provides a program product, wherein instructions in the program product, when executed by a processor of an electronic device, cause the electronic device to implement the method for monitoring tower clearance provided by the embodiment according to the first aspect of the application.

BRIEF DESCRIPTION OF THE DRAWINGS

In order to illustrate technical solutions of embodiments of the present application more clearly, the drawings required for the embodiments of the present application will be briefly described. For a person skilled in the art, other drawings can also be obtained from these drawings without any inventive effort.

The description of reference signs in the accompanying drawings is as follows:

E-A: top view; E-B: left view; E-C: main view; 201—generator; 202—nacelle; 203—lidar; 204—first laser beam; 205—second laser beam; 206—third laser beam; 207—fourth laser beam; 208—blade tip plane; 209—blade tip crossing plane; 210—top cross-section circle of tower barrel; 211—cross-section circle of tower barrel at blade tip plane; 212—bottom cross-section circle of tower barrel; 213—blade; 214—hub; 215—blade model; 216—real blade; Ln-1: (n-1)th laser beam; Ln: nth laser beam.

DETAILED DESCRIPTION

Features of various aspects and exemplary embodiments of the present application will be described in detail below. In order to make objects, technical solutions and advantages of the present application clearer, the present application is further described in detail below with reference to the drawings and specific embodiments. It should be understood that the specific embodiments described herein are only used to explain the present application, but not to limit the present application. For those skilled in the art, the present application can be implemented without some of these specific details. The following description of the embodiments is only to provide a better understanding of the present application by illustrating examples of the present application.

It should be noted that in the disclosure, relational terms such as first and second are only used to distinguish one entity or operation from another entity or operation, and do not necessarily require or imply any real relationship or order between these entities or operations. Moreover, the terms "comprising", "including", or any other variation thereof are intended to encompass non-exclusive inclusion, such that a process, a method, an item, or a device including a series of elements not only includes those elements, but also includes other elements that are not explicitly listed, or also includes elements inherent to such process, method, item, or device. Without further limitations, the elements limited by the statement "including . . . " do not exclude the existence of other identical elements in the process, method, item, or device including said elements.

In order to address relevant technical problems, the embodiments of the application provide a method, an apparatus, a device, and a readable storage medium for monitoring tower clearance. The method for monitoring tower clearance provided by an embodiment of the application will be firstly described below.

Figure 1:
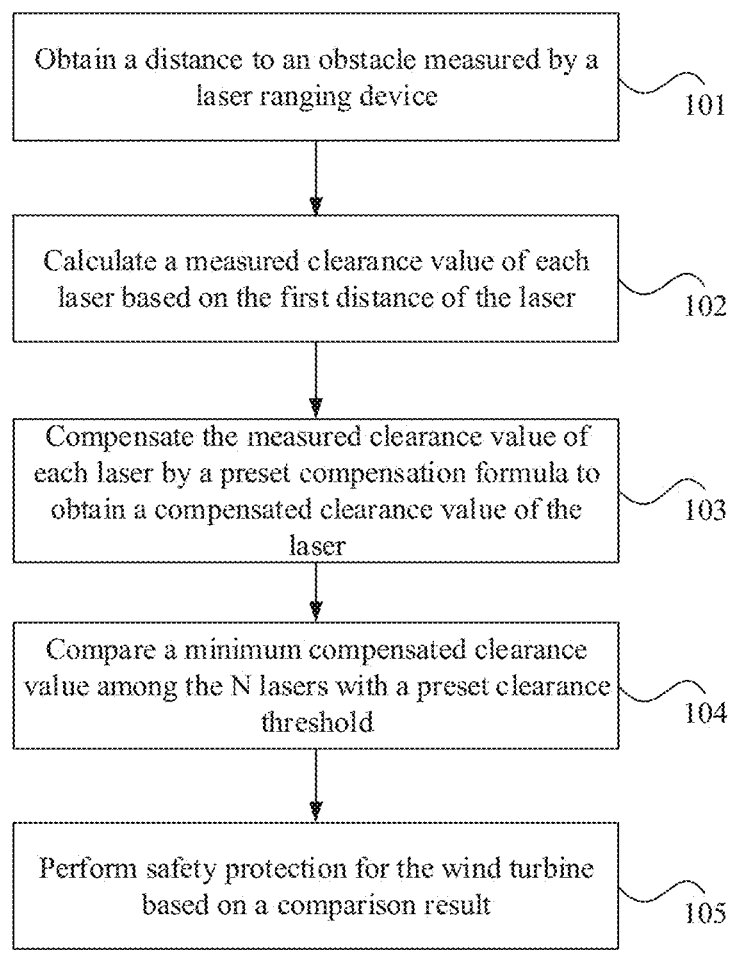
FIG. 1 is a schematic flowchart of a method for monitoring tower clearance provided by an embodiment of the present application.

FIG. 1 is a schematic flowchart of a method for monitoring tower clearance provided by an embodiment of the present application. As shown in FIG. 1, the method may include steps 101 to 105 as follows.

Step 101, obtaining a distance to an obstacle measured by a laser ranging device.

The laser ranging device may be mounted eccentrically at a bottom of a nacelle 202 of a wind turbine, and emit N lasers at different fixed angles toward a blade tip plane 208, where N is a positive integer greater than one. The blade tip plane 208 is a plane that passes through a tip of any blade and is parallel to the ground when the blade points vertically toward the ground.

Figure 2:
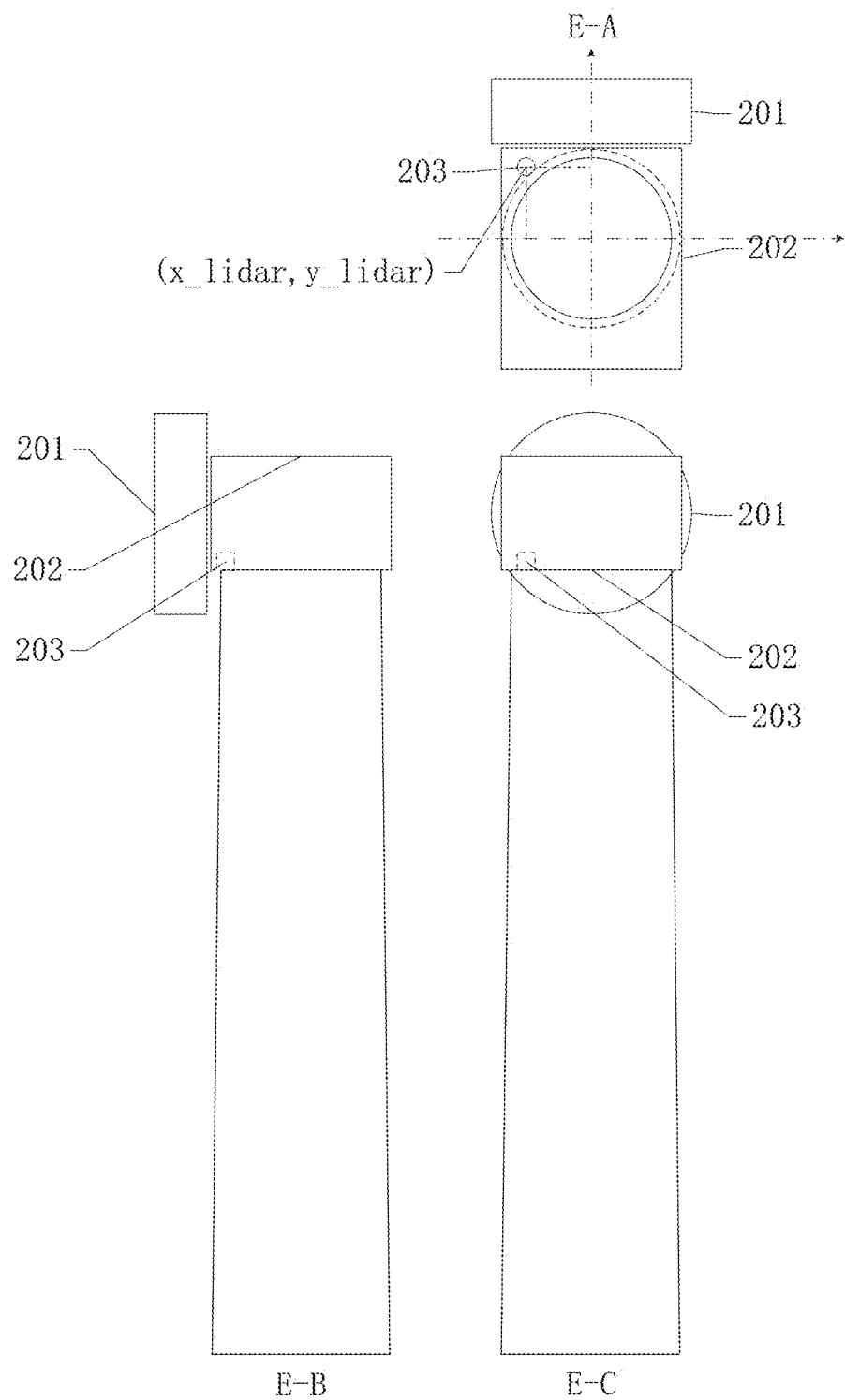
FIG. 2 is a schematic principle diagram I of a method for monitoring tower clearance provided by an embodiment of the present application.

In an example, as shown in FIG. 2, a lidar 203 of the laser ranging device may be mounted eccentrically at a position at the bottom of the nacelle 202 and close to the generator 201, the lidar 203 is adjusted to be in a horizontal plane, and the mounting position (x_lidar,y_lidar) of the lidar 203 is measured, and by calibration, laser beams can be emitted at fixed and tilted angles in a direction parallel to the blade (i.e., a direction vertical to the left view or the main view in FIG. 2). In order to guarantee stability and reliability of overall operation, an installation interface for a pre-buried flange can be reserved in advance at the bottom of the nacelle 202, and the lidar 203 can be connected to the nacelle 202 via a bracket of the nacelle 202. The bracket can meet the functions of supporting and angle adjustment, and comes with a hand hole to meet the requirements of on-site operation and maintenance.

Optionally, the N lasers may include a first laser and a second laser. The first laser and the second laser are emitted in a vertical direction at the front (i.e., the main view) of the wind turbine, and emitted in a tilt direction at the side (e.g., the left view) of the wind turbine, and titled angles of the first laser and the second laser at the side of the wind turbine are different. In this way, by emitting a plurality of lasers at different tilted angles at the side of the wind turbine, it is possible to obtain the clearance values obtained when the lasers hit the blade at different locations or do not hit the blade. In this case, a minimum value of the clearance values measured by the lasers at different angles is taken as the final result, which can prevent a situation in which the lasers do not hit the blade and thus the measurement results are not accurate.

Optionally, the N lasers may further include a third laser. The third laser is emitted in a tilt direction at the front of the wind turbine and at the same tilted angle as the first laser at the side of the wind turbine. By emitting the third laser which has the same tilted angle as the first laser at the side of the wind turbine and has a different angle from the first laser at the front of the wind turbine, it is possible to make the clearance value measured by the third laser and the clearance value measured by the first laser refer to each other. Since the tilted angles of the two lasers at the side of the wind turbine are the same, the clearance values measured by the two lasers should be the same or similar, and if the difference is too large, it means that there may be abnormalities in the measurement data. The validity and authenticity of the measurement results can be improved.

Figure 3:
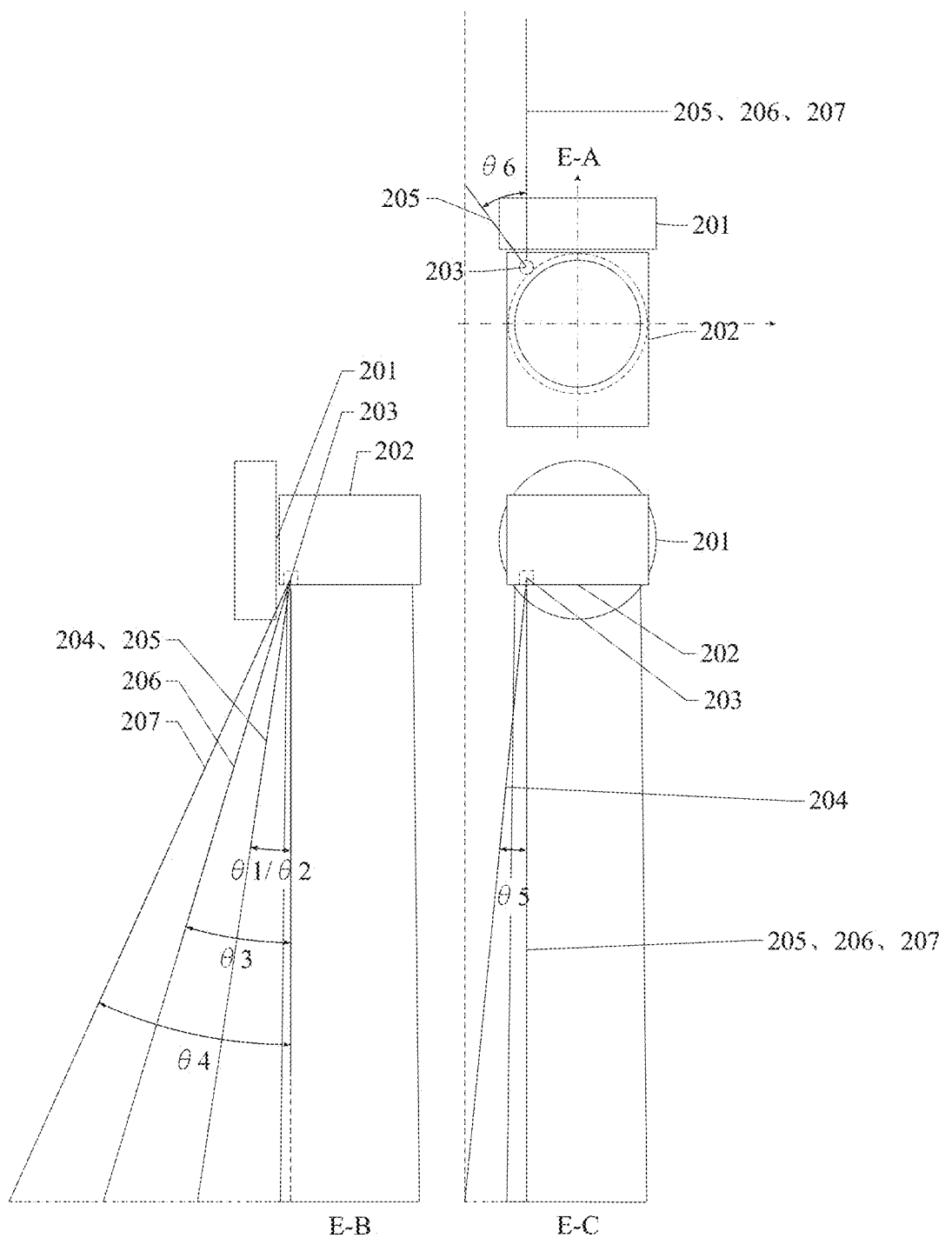
FIG. 3 is a schematic principle diagram II of a method for monitoring tower clearance provided by an embodiment of the present application.

An example laser emission method is shown in FIG. 3. The lidar 203 can emit four lasers, among which a projected angle θ1 in the left view of the angle between the first laser beam 204 (i.e., the third laser) and the tower barrel is the same as the angle θ2 between the second laser beam 205 (i.e., the first laser) and the tower barrel, and the third laser beam 206 (i.e., the second laser) and the fourth laser beam 207 are respectively emitted at angles of θ3 and θ4 with the tower barrel. As can be seen from the main view of FIG. 3, the projections of the second, third, and fourth laser beams on the main view are emitted vertically downward, while the first laser beam 204 is tilted at an angle of θ5 to the left from the vertical direction. In the top view, the angle between the first laser beam 204 and the second, third, and fourth lasers 205~207 is θ6. It is to be noted that FIG. 3 shows an exemplary laser emitting method, and the specific emission angles and number of the N lasers can be set as desired, which is not limited in the embodiments of the present application.

For each laser, after the laser is emitted toward the blade, if the laser encounters the obstruction from the blade, the distance between the laser (the position where the laser is emitted) and the obstacle (the position point at the obstacle where the laser is obstructed) can be measured, and a first distance measured by the laser is obtained.

Step 102, calculating a measured clearance value of each laser based on the first distance of the laser.

The laser ranging device can measure the first distance of each laser. Based on the first distance of each laser in combination with the geometric relationship, the measured clearance value of each laser can be calculated. The measured clearance value is a distance between a projection of a position point on the blade where the laser is obstructed and a projection of the tower wall of the tower barrel of the wind turbine on the blade tip plane 208, and is calculated from the first distance.

Optionally, for the second to fourth laser beams shown in FIG. 3, the calculation may be the same since these laser beams are emitted in the vertical direction in the main view. Specifically, taking the first laser as an example, the first distance of the first laser may be multiplied with a sine value of the tilted angle of the first laser at the side (left view) to obtain an uncorrected clearance value of the first laser.

The uncorrected clearance value is a distance difference between a projection of the mounting position of the laser ranging device and a projection of the position where the laser is obstructed on the blade tip plane. Referring to FIG. 2, the projected coordinates of the mounting position of the laser ranging device in the top view are (x_lidar, y_lidar). Referring to the top view of FIG. 4, the uncorrected clearance value is the distance between projections of the mounting position of the laser ranging device (lidar 203) and the blade tip crossing plane 209 (i.e. the position on the blade where the laser is obstructed) on the top view (the top view is parallel to the blade tip plane 208).

Figure 5:
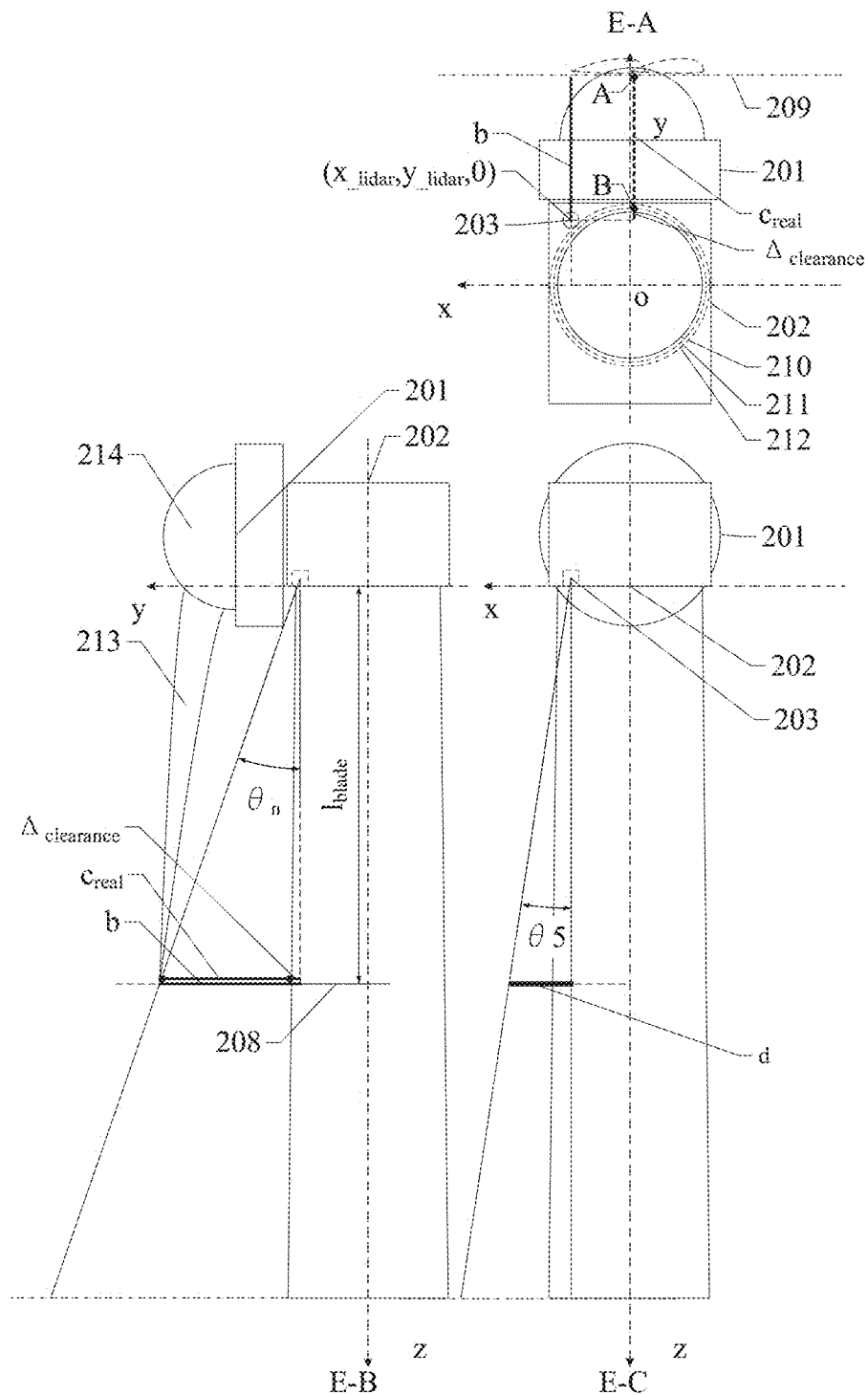
FIG. 5 is a schematic principle diagram IV of a method for monitoring tower clearance provided by an embodiment of the present application.

Based on the first distance of each laser, the measured clearance value of the laser can be calculated. Specifically, the uncorrected clearance value of each laser can be calculated first based on the first distance of each laser and the tilted angle of the laser at the side, and then the measured clearance value can be obtained by subtracting the second distance from the uncorrected clearance value and adding the third distance. The second distance is a distance between the mounting position of the laser ranging device and a circle center of the tower barrel in the blade tip plane, referring to the distance from the lidar 203 to the x-axis. Referring to FIG. 5, the third distance is a radius of a cross-section 211 of the tower barrel in the blade tip plane 208.

Since the measured clearance value is the distance between the position where the laser is obstructed by the blade and the tower wall in the blade tip plane, and the uncorrected clearance value is the distance between the position where the laser is obstructed by the blade and the mounting position of the laser ranging device in the blade tip plane, there is a certain distance error between the measured clearance value and the uncorrected clearance value. This is due to the fact that the tower barrel is a cylinder with a relatively small diameter at the top and a relatively large diameter at the bottom, whose profile in the left view and the main view is a trapezoidal shape, and the laser ranging device is not mounted on the tower wall, and there is a certain distance error between the tower wall and the mounting position of the laser ranging device in the blade tip plane. This distance error can be eliminated by subtracting the second distance from the uncorrected clearance value and adding the third distance, thereby improving the accuracy of the measured clearance value.

For the first laser, the uncorrected clearance value may be a distance along the direction of the y-axis in the left view (referring to FIG. 5) to a straight line in the vertical direction passing through the laser emission position (i.e., the mounting position of the laser ranging device). See distance b in the left view in FIG. 5.

Then by adding the uncorrected clearance value b to the third distance to obtain the distance from the blade tip crossing plane 209 to the x-axis in the top view in FIG. 5 and then subtracting the second distance, the measured clearance value $c_{real}$ shown in FIG. 5 can be obtained. The difference of the third distance minus the second distance is the distance $\Delta_{clearance}$ shown in FIG. 5.

The above is the principle of calculating the measured clearance value, and based on the above principle, different specific implementations can be evolved in practical applications based on the deformation of the trigonometric formula and the like. An optional specific implementation of calculation for the first laser (the calculation method for the second laser beam 205 to the fourth laser beam 207 are the same) based on the above principle will be further described in detail below.

The following dimensional information of the wind turbine is known: the diameter of the top cross-section circle 210 of the tower barrel is $\Phi_{top}$, the diameter of the bottom cross-section circle 212 of the tower barrel is $\Phi_{bottom}$, the height of the tower barrel is $H_{tower}$, and the length of the blade is $L_{blade}$, the distance of the yaw center of mounting the laser ranging device from the origin of the radar center is $X_{lidar}$ on the x-axis, and the distance of the yaw center from the radar center is $Y_{lidar}$ on the y-axis.

Figure 4:
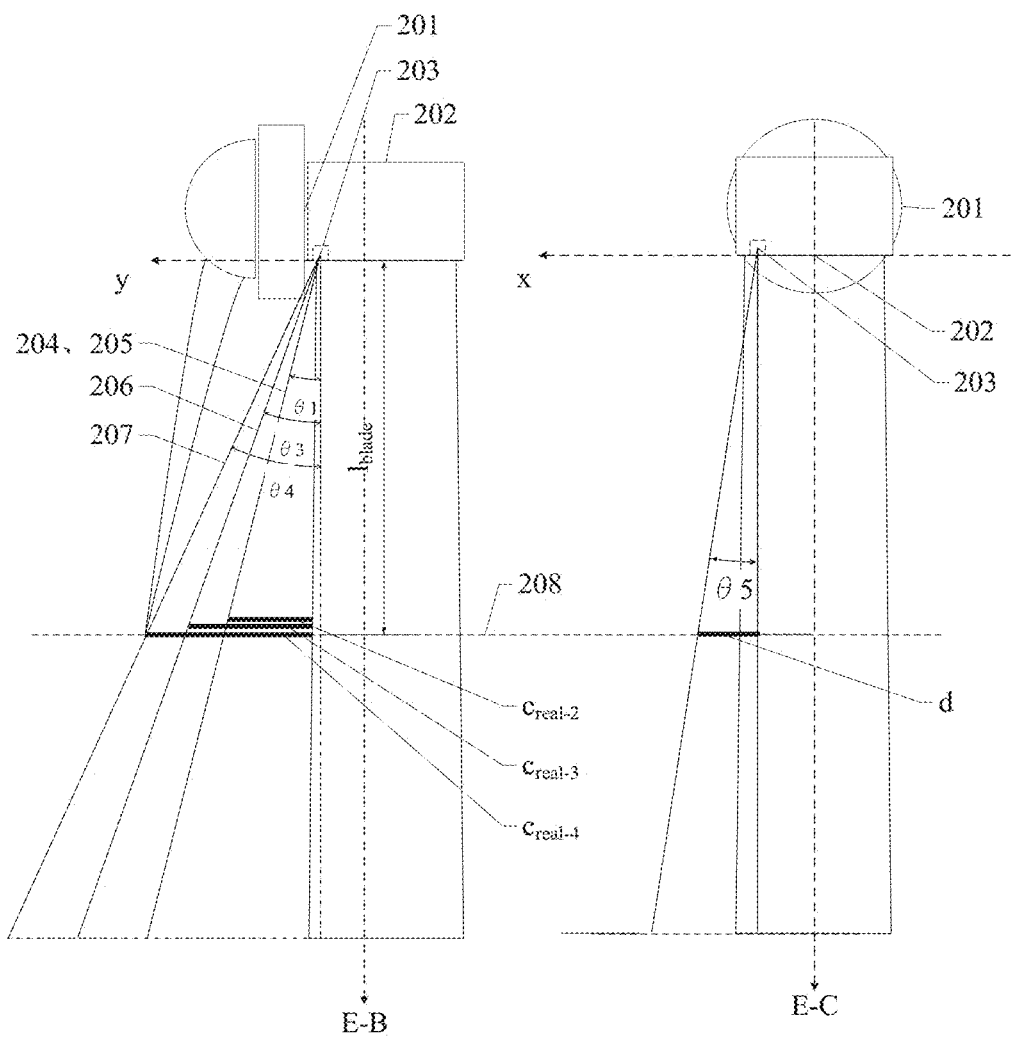
FIG. 4 is a schematic principle diagram III of a method for monitoring tower clearance provided by an embodiment of the present application.

Referring to FIG. 4, in an example implementation, for the four laser beams emitted by the lidar 203, the distance from the second laser beam 205 to the tower barrel in the blade tip plane is a preset fixed value such as 4 meters, the distance from the third laser beam 206 to the tower barrel in the blade tip plane is a preset fixed value such as 6 meters, the distance from the fourth laser beam 207 to the tower barrel in the blade tip plane is a preset fixed value such as 8 meters, and the distance d between the first laser beam 204 and the second laser beam 205 in the blade tip plane in the main view is a preset fixed value such as 5 meters.

If the effects of the laser clearance mounting position and the shape of the tower barrel are ignored, the angle value of each laser can be calculated according to the trigonometric relationship with the following formula:

$$\begin{cases} \tan\theta_1 = \tan\theta_2 = \dfrac{4}{l_{blade}} \\ \tan\theta_3 = \dfrac{6}{l_{blade}} \\ \tan\theta_4 = \dfrac{8}{l_{blade}} \\ \tan 5 = \dfrac{5}{l_{blade}} \end{cases} \quad \text{Formula 1}$$

The angle values $\theta_1$, $\theta_2$, $\theta_3$, $\theta_4$, $\theta_5$ can be obtained from the above relationship formula. $\theta_5$ is a projected angle of the angle between the first laser beam and the second laser beam on the main view. In addition, a projected angle $\theta_6$ of the angle between the first laser beam and the second laser beam on the top view can be calculated. The first laser beam and the second laser beam have the same angle with the vertical direction in the left view.

When mounting the laser ranging device on-site, the mounting angle can be adjusted by an attitude adjustment knob that comes with the laser ranging device to ensure that the beam position of each laser is accurate. Specifically, based on the fixed distance of the four laser beams from the tower barrel in the blade tip plane as described above, the angle of each laser beam with the vertical direction can be calculated by the formula described above, and then, the laser beams can be adjusted to corresponding angles by the attitude adjustment knob to ensure that the distance between each laser beam and the tower barrel is the corresponding preset fixed distance.

Considering the influence of the mounting position of the lidar 203 and the shape of the tower barrel, the tower barrel can be equated to a circular platform.

The lidar 203 is mounted on a nacelle hood at the bottom of the nacelle 202. It is needed to adjust the lidar 203 to be mounted in the horizontal plane. The center of the top cross-section circle 210 of the tower barrel is taken as the coordinate origin, an axis facing the left side of the impeller is the x-axis, an axis along the impeller direction is the y-axis, an axis along the gravity direction is the z-axis, and the mounting position of the lidar 203 is measured as $(x_{lidar}, y_{lidar}, 0)$. The blade length is known to be $l_{blade}$, and $z=l_{blade}$ is defined as the blade tip plane. The tower barrel is equated to a circular platform, the diameter of the top cross-section circle 210 of the tower barrel is $\Phi_{top}$, the diameter of the bottom cross-section circle of the tower barrel is $\Phi_{bottom}$, and the height of the tower barrel is $H_{tower}$.

The value $x_{lidar}$ of the distance of the mounting position of the lidar 203 from the yz plane is very small, and the blade rotates at a fast speed, so it can be assumed that the blade crossing plane consisting of the blade tip and the point with the smallest clearance at the lidar 203 is parallel to the xz plane, and it can be seen from the left view of FIG. 5 that, for the second to fourth laser beams, the calculated value b (i.e., the value of the uncorrected clearance value) can be calculated by the first distance $a_n$ returned from the nth laser beam (i.e. the returned ranging value when the laser beam hits the blade) and the laser angle $\theta_n$ of the nth laser beam, as shown by the following formula.

$$b = a_n \cdot \sin\theta_n \quad \text{Formula 2}$$

Referring to the top view in FIG. 5, point A has the coordinates $(0, b+y_{lidar}, 0)$, point B is the maximum y-value point of the projection of the cross-section of the tower barrel in the blade tip plane 208 on the xy-plane, and has the coordinates $(0, y_b, 0)$. The formula for calculating the radius $y_b$ of the cross-section circle 211 of the tower barrel in the blade tip plane 208 is shown below.

$$y_b = \frac{\varphi_{tip}}{2} \quad \text{Formula 3}$$

Further, the measured clearance values $c_{real-n}$ (n=2, 3, 4) of the second to fourth laser beams can be calculated by the following formula (referring to FIG. 4).

$$c_{real-n} \approx c_n = \\ OA - OB = b + y_{lidar} - y_b = a_n \cdot \sin\theta_n + y_{lidar} - \frac{\varphi_{tip}}{2} \quad \text{Formula 4}$$

Here, $\varphi_{tip}$ is the diameter of the cross-section circle 211 of the tower barrel in the blade tip plane in FIG. 4, i.e., two times the third distance, which is calculated as follows:

$$\Phi_{tip} = (\Phi_{top} + (H_{tower}/L_{blade}) * (\Phi_{bottom} - \Phi_{top}))/2 \quad \text{Formula 5}$$

When calculating the uncorrected clearance value of the third laser (the first laser beam 204), the uncorrected clearance value of the third laser may be calculated based on a first distance $a_1$ of the third laser, a length $L_{blade}$ of the blade, a tilted angle $\theta_1/\theta_2$ of the third laser at the side, and a projection angle $\theta_5$ of the angle between the first laser and the third laser at the front of the wind turbine.

An optional specific implementation of calculating the measured clearance value of the third laser may include the following steps.

Figure 6:
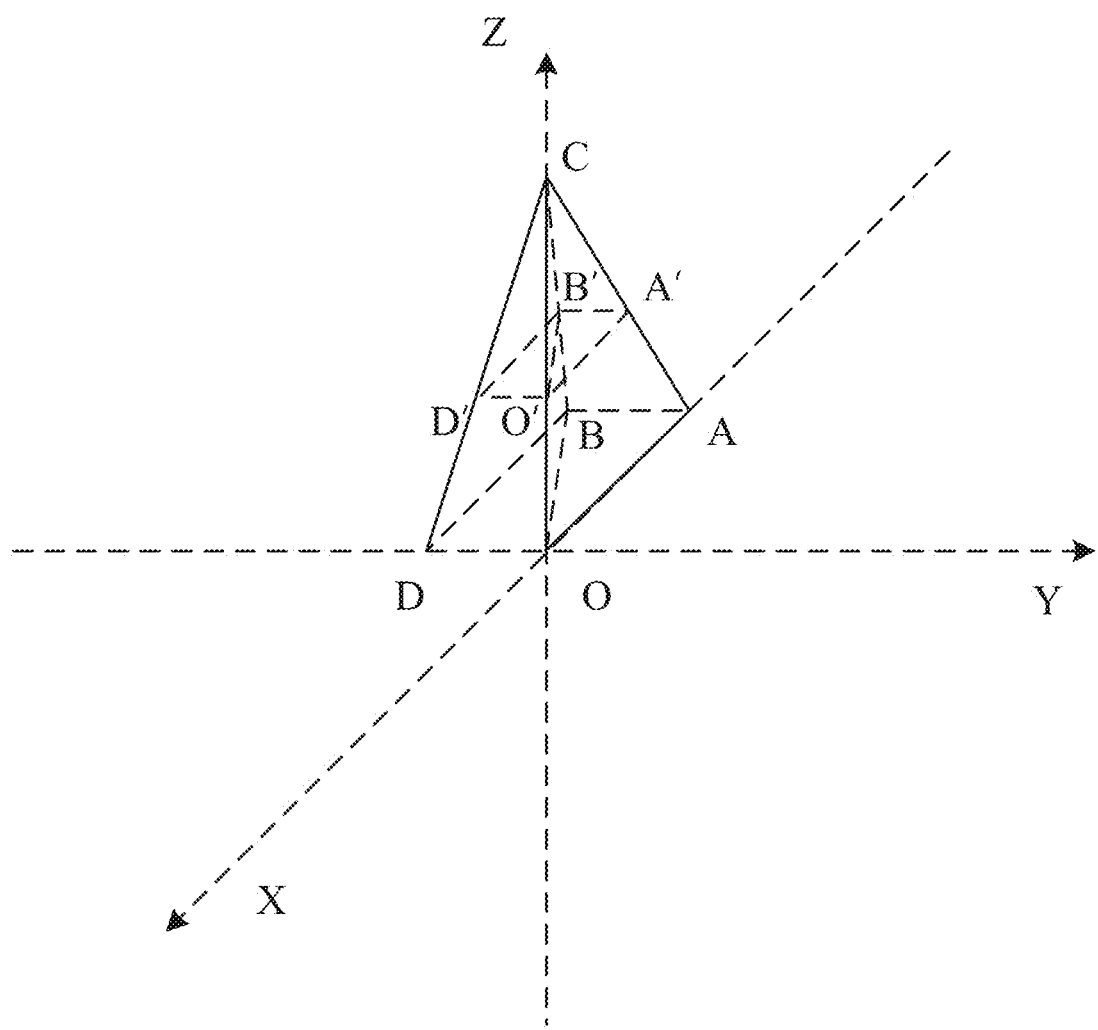
FIG. 6 is a schematic principle diagram V of a method for monitoring tower clearance provided by an embodiment of the present application.

Referring to FIG. 6, a spatial rectangular coordinate system is established with the projection point O of the mounting position of the lidar 203 in the blade tip plane as the origin, the axis in the direction away from the impeller as the X-axis, and the axis in the direction along the lidar 203 as the Z-axis. CA is the second laser beam 205 and CB is the first laser beam 204 with the preset values of OA=4 m and AB=5 m. B'C=$a_1$, $\angle ACO=\theta_1$, and $\angle OCD=\theta_5$. The O'A'D' plane is parallel to the blade tip plane OAD and intersects with BC at point B', and O'A' is the clearance value without considering the mounting position of lidar 203 and the shape of the tower barrel. Formula 6 can be obtained from the trigonometric relationship, OA can be obtained from Formula 7, BC can be obtained from Formula 8, and then, the uncorrected clearance distance O'A' can be obtained from CB' based on Formula 9, and finally, the measured clearance value $c_{real-1}$ of the first laser beam 204 (the third laser) is calculated as shown by Formula 10.

$$O'A' = \frac{B'C}{BC} \cdot OA \quad \text{Formula 6}$$

-continued $$OA = OC \cdot \tan \angle ACO \quad \text{Formula 7}$$

$$BC = \sqrt{BD^2 + CD^2} = \sqrt{OA^2 + \left(\frac{OC}{\cos \angle OCD}\right)^2} = \sqrt{l_{blade}^2 \cdot \tan^2 \theta_1 + \frac{l_{blade}^2}{\cos^2 \theta_5}} \quad \text{Formula 8}$$

$$O'A' = \frac{l_{blade} \cdot \tan \theta_1}{\sqrt{l_{blade}^2 \cdot \tan^2 \theta_1 + \frac{l_{blade}^2}{\cos^2 \theta_5}}} \cdot B'C = \frac{l_{blade} \cdot \tan \theta_1}{\sqrt{l_{blade}^2 \cdot \tan^2 \theta_1 + \frac{l_{blade}^2}{\cos^2 \theta_5}}} \cdot a_1 \quad \text{Formula 9}$$

$$c_{real-1} \approx c_1 = a_1 \cdot \frac{l_{blade} \cdot \tan \theta_1}{\sqrt{l_{blade}^2 \cdot \tan^2 \theta_1 + \frac{l_{blade}^2}{\cos^2 \theta_5}}} + y_{lidar} - \frac{\varphi_{tip}}{2} \quad \text{Formula 10}$$

Step 103, compensating the measured clearance value of each laser by a preset compensation formula to obtain the compensated clearance value.

Figure 7:
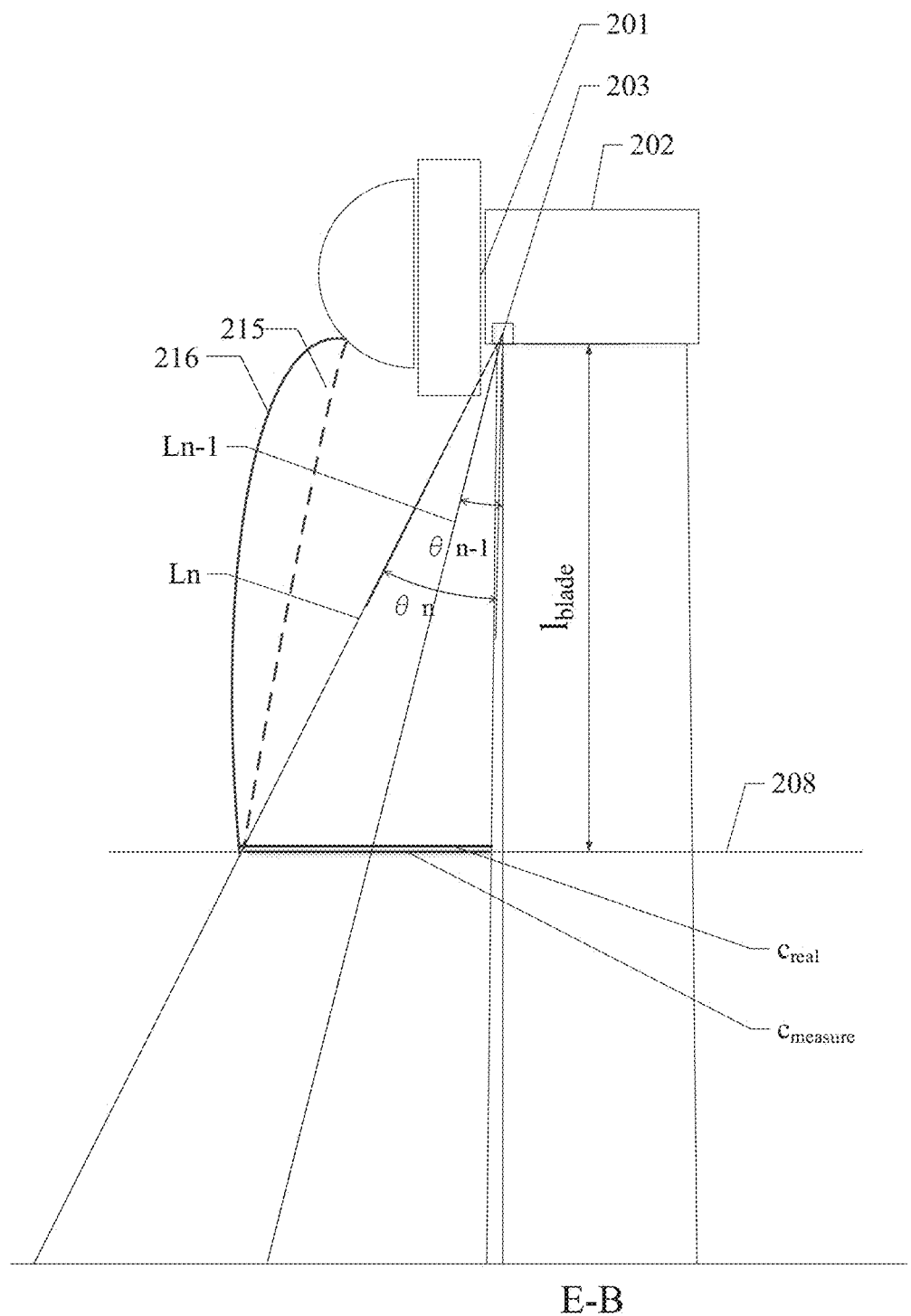
FIG. 7 is a schematic principle diagram VI of a method for monitoring tower clearance provided by an embodiment of the present application.
Figure 8:
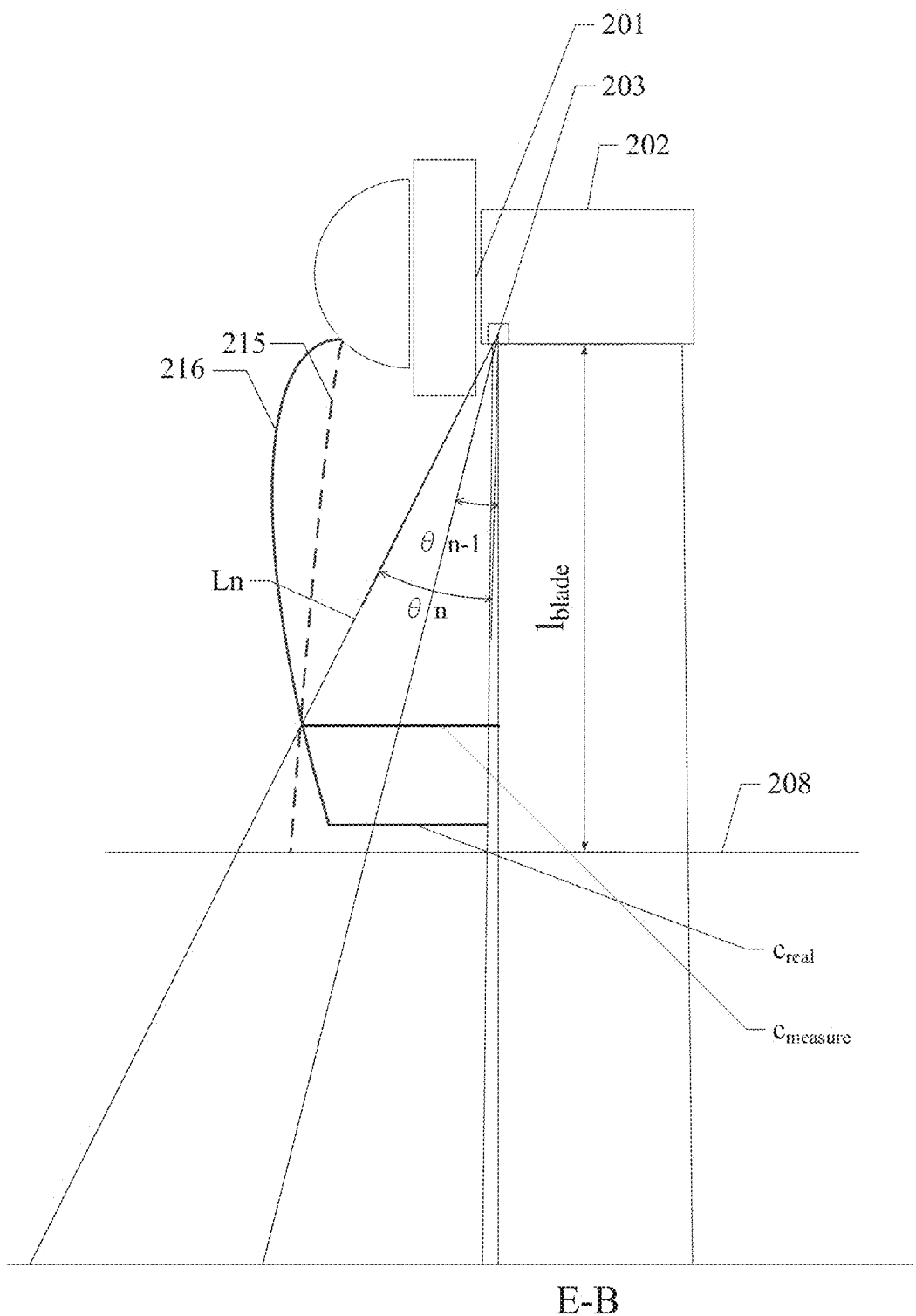
FIG. 8 is a schematic principle diagram VII of a method for monitoring tower clearance provided by an embodiment of the present application.

The blade is equated to a straight line when calculating the measured clearance value as described above. However, during the actual operation of the wind turbine, due to the influence of different wind conditions, blade materials, blade airfoils, and blade lengths, etc., the blade (blade tip) may have different degrees of bending deformation. For example, referring to FIGS. 7 and 8, the shape of the real blade 216 and the shape of the simulated blade model 215 are different, so a certain error may be caused by the laser beams hitting different positions of the blade. Referring to FIGS. 7 and 8, a certain length error exists between the measured clearance value $c_{measure}$ and the blade tip clearance value $c_{real}$. Therefore, the measured clearance value can be compensated by a preset compensation formula for the bending of the blade to obtain a more accurate compensated clearance value and improve the accuracy of the clearance value.

In an example, before compensating the measured clearance value of each laser by the preset compensation formula to obtain the compensated clearance value, a dynamics model of the wind turbine can also be established, and the blade states of the blade of the wind turbine under different wind conditions can be simulated according to the dynamics model, so as to calculate the blade tip clearance values (i.e., the distances between the simulated blade tip and the tower wall) under different blade states, as well as the measured clearance values obtained by performing measurement when the lasers are emitted at different angles to different locations of the blade under corresponding blade states. In this way, based on the measured clearance value and the blade tip clearance value, preset compensation formulas can be established for the lasers of different angles. The established preset compensation formula can be used for calculating, based on the measured clearance value, the blade tip clearance value of the laser of the corresponding angle. Herein, the blade tip clearance value is the above-described compensation clearance value.

For each angle of the laser, according to the different bending states of the blade, a certain difference exists between the measured clearance value obtained by measurement and the blade tip clearance value when the laser irradiates at different positions of the blade. The relationship between the measured clearance value and the blade tip clearance value can be found by establishing the simulation model, so as to obtain the preset compensation formula. Thus, the preset compensation formula can represent the relationship between the measured clearance value obtained by the laser measurement and the blade tip clearance value, and the measured clearance value can be compensated by the preset compensation formula, so as to obtain a more accurate final measurement result and thus prevent the safety protection strategy based on the clearance value from generating an action that does not match the actual situation.

Specifically, an optional specific implementation of modeling and then establishing the preset compensation formula may be described by referring to the following process.

First, the dynamics model of the wind turbine with the laser ranging device may be constructed based on the dynamics principle, and a digitally simulated wind turbine model corresponding to the work site may be constructed based on a digital twin concept.

Through the analysis and testing of the digitally simulated wind turbine model, the limitations such as incomplete wind conditions at the site, limited laser measurement range, etc. can be compensated, so as to make optimal compensation for the clearance value algorithm applicable at the site.

The digitally simulated wind turbine model with the laser ranging device mapped to the real wind turbine can not only simulate the real operation state response of the wind turbine and the measured clearance (simulation) value measured by the laser ranging device, but also measure the blade tip clearance (simulation) value between the blade tip of the model and the tower wall. According to the correspondence between the measured clearance value and the blade tip clearance value in combination with the clearance value actually measured on-site, the accuracy of the measured clearance value is compensated and the compensated clearance value is obtained, which improves the accuracy of the clearance value and makes the control of safety protection based on the clearance in practical applications more safe and reliable.

Figure 9:
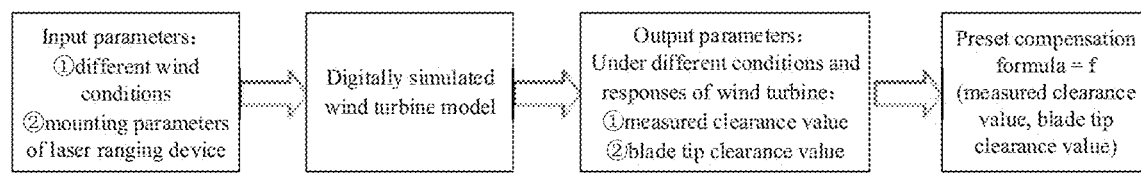
FIG. 9 is a schematic flowchart of establishing a preset compensation formula in a method for monitoring tower clearance provided by an embodiment of the present application.

Referring to FIG. 9, input parameters of the digitally simulated wind turbine model may include different wind conditions and the mounting parameters of the laser ranging device, the modeling is carried out according to the input parameters, and finally the operation state of the wind turbine is simulated based on the dynamics principle. Based on the relative coordinate system, the measured clearance values under different wind conditions and when the wind turbine has various vibration responses and the lasers are emitted to different positions of the blade can be output and compared with the blade tip clearance values calculated by simulation. The relationship f (measured clearance value, blade tip clearance value) between the blade tip clearance values and the measured clearance values can be established according to the comparison result, so as to obtain the final preset compensation formula.

Figure 10:
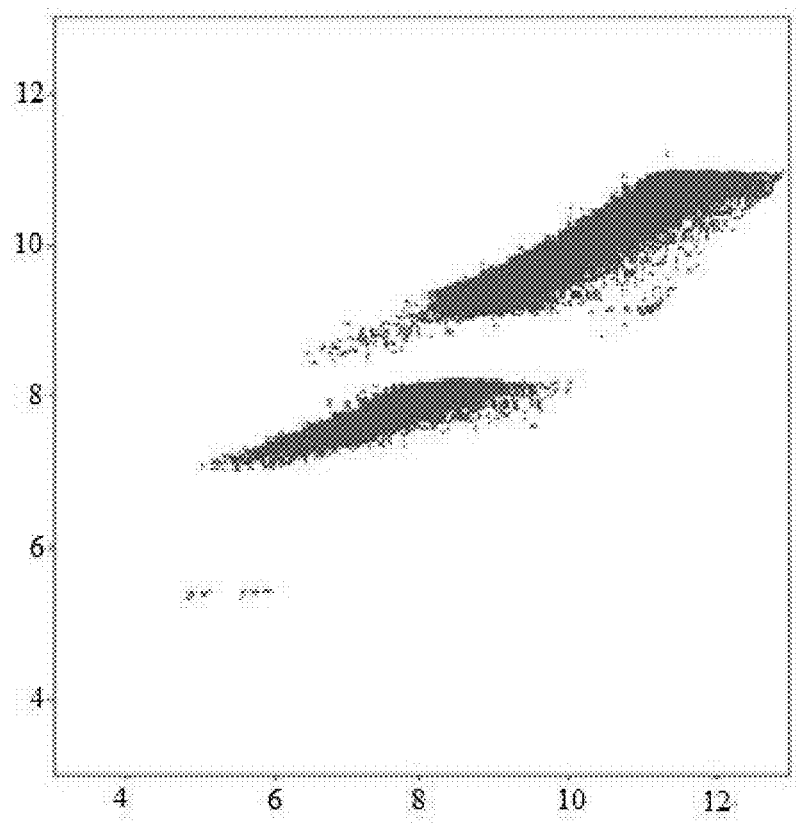
FIG. 10 is a schematic diagram I of data distribution of measured clearance values and compensated clearance values in a method for monitoring tower clearance provided by an embodiment of the present application.
Figure 11:
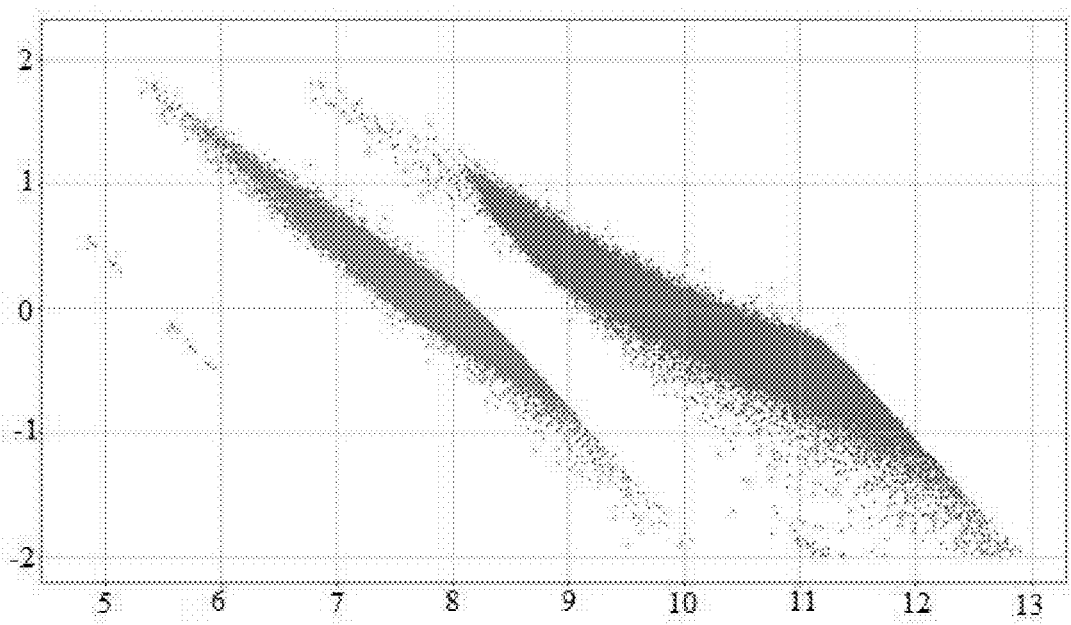
FIG. 11 is a schematic diagram II of data distribution of measured clearance values and compensated clearance values in a method for monitoring tower clearance provided by an embodiment of the present application.
Figure 12:
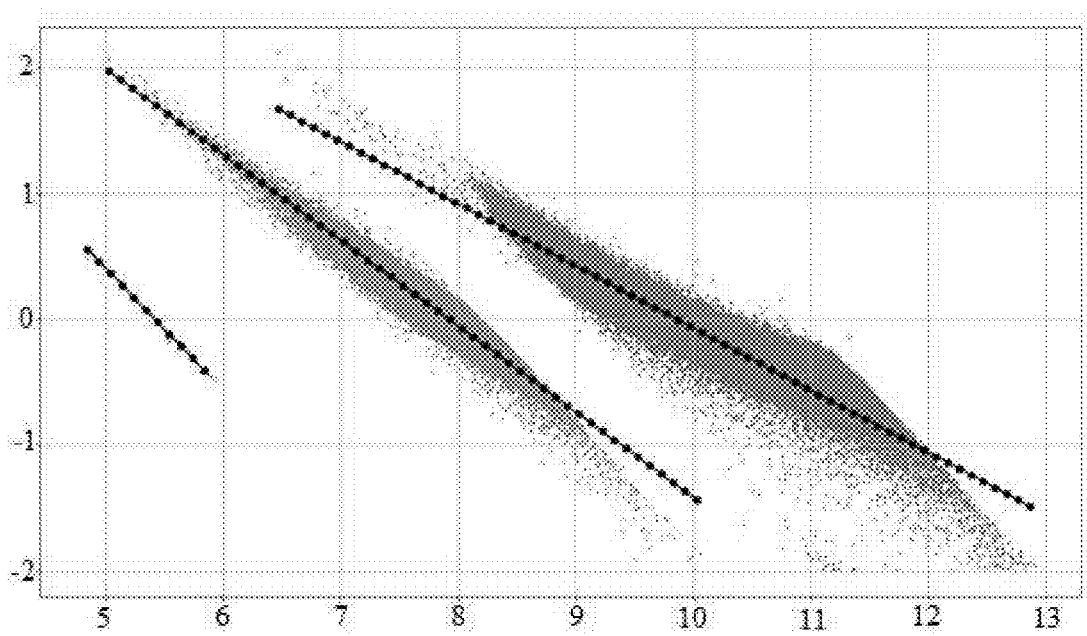
FIG. 12 is a schematic diagram III of data distribution of measured clearance values and compensated clearance values in a method for monitoring tower clearance provided by an embodiment of the present application.

The horizontal coordinate of FIG. 10 is the blade tip clearance value and the vertical coordinate is the measured clearance value. The horizontal coordinate of FIG. 11 is the measured clearance value, and the vertical coordinate is the difference between the measured clearance value and the blade tip clearance value. The three point cloud data from left to right represent the difference between the measured clearance value and the blade tip clearance value for different beams, respectively. From FIG. 12, it can be seen that there is a strong linear relationship between the difference between the measured clearance value and the blade tip clearance value and the measured clearance value/blade tip clearance value for each laser, and a linear fitting of the above data yields the relationship formula.

According to Measured Clearance–Blade Tip Clearance=K*Blade Tip Clearance+B, the following formula is obtained:

Blade Tip Clearance=(Measured Clearance–B)/(K+1).

The relationship formula obtained by fitting is the preset compensation formula for the corresponding laser.

Figure 13:
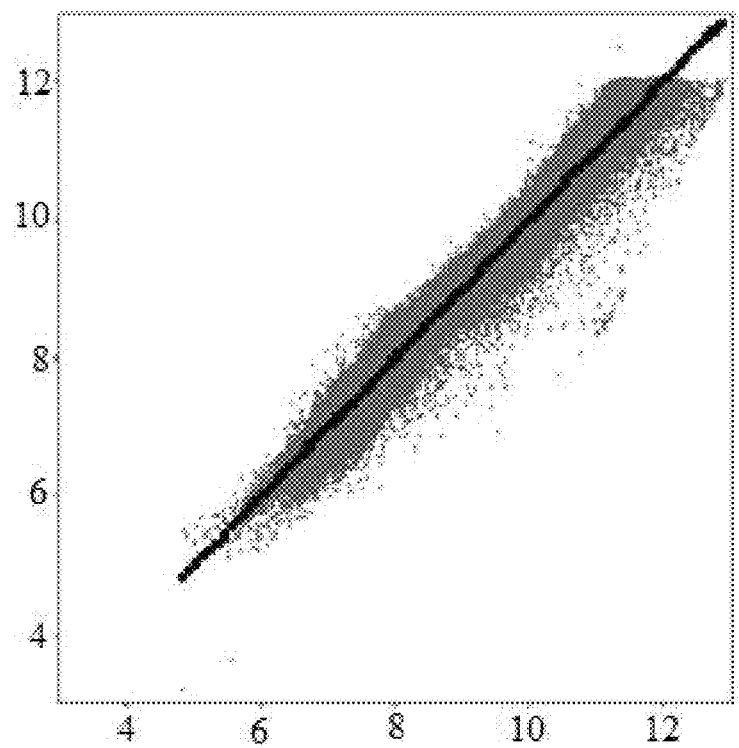
FIG. 13 is a schematic diagram IV of data distribution of measured clearance values and compensated clearance values in a method for monitoring tower clearance provided by an embodiment of the present application.

The preset compensation formula is verified, the measured clearance value is compensated to obtain the compensated clearance value, and the minimum compensated clearance value among the three beams can be compared with the real clearance value obtained by real measurement. With reference to FIG. 13, the horizontal coordinate is the minimum compensated clearance value, the vertical coordinate is the real clearance value, and the slope of the fitted straight line is 1.0000000043734565, the intercept is −5.217980585392468e-07, the formula real_Clearance_m (real clearance value)=1.0000000043734565*Clearance_laser_m_modify (minimum compensated clearance value)+−5.217980585392468e-07 is obtained, the fitting degree $R^2$ factor reaches 0.955 and the linear correlation coefficient is 0.977. From the above results, it can be seen that the algorithm shows good results after applying it to compensate the measured clearance value.

Step 104, comparing the minimum compensated clearance value among the N lasers with a preset clearance threshold.

Since the compensated clearance values obtained from the N lasers are different, the compensated clearance value with the smallest value (i.e. minimum compensated clearance value) is taken for comparison with the preset clearance threshold.

Step 105, performing safety protection for the wind turbine based on a comparison result.

If the minimum compensated clearance value is greater than the preset clearance threshold, it means that there is still a certain distance (clearance) from the blade tip to the tower wall and it is safe, otherwise, if the minimum compensated clearance value is less than the preset clearance threshold, it means that the blade tip is too close to the tower wall, and it is necessary to perform a safety protection processing.

Optionally, at the time of safety protection, an example implementation includes: controlling the wind turbine to shut down if the minimum compensated clearance value is less than a shutdown threshold; and controlling the wind turbine to pitch to increase a pitch angle of the blade of the wind turbine if the minimum compensated clearance value is less than a pitch threshold and greater than the shutdown threshold.

Since there may be errors in the measurement results, in order to prevent inaccuracies in the comparison results, which lead to frequent pitching and shutdown of the wind turbine, whether the comparison results are valid can be verified. Since the angle of laser emission is fixed, the impeller needs to be rotated to a fixed angle interval before the blade may block the laser. Therefore, it is possible to judge whether the blade actually blocks the laser based on the angle interval in which the azimuth angle of the impeller is located, and thus judge whether the measured clearance value obtained from the laser measurement is valid. If it is determined that it is impossible for the blade to block the laser based on the angle interval in which the azimuth angle of the impeller is located, the measured clearance value is considered to be an invalid value, and the safety protection processing is not performed.

Specifically, in an exemplary implementation, in the case where the minimum compensated clearance value is less than the pitch threshold, before performing safety protection for the wind turbine based on the comparison result, an azimuth angle collected by an azimuth angle sensor configured for the impeller of the wind turbine may also be acquired, and whether the comparison result is valid may be verified based on the azimuth angle of the impeller, and if the azimuth angle is in a preset azimuth angle interval, it is determined that the comparison result is valid; otherwise, it is determined that the comparison result is invalid.

In this way, the validity of the measured clearance value is verified by the azimuth angle of the impeller, so that inaccurate monitoring results due to data anomalies can be excluded and the accuracy of the clearance value can be improved.

Optionally, in addition to verifying the validity of the measured clearance value by the azimuth angle of the impeller, a logic verification can be performed according to the relative positional relationship between the third laser (the first laser beam) and the first laser on the side of the wind turbine as described above.

In the case that the blade is rotated along the direction from the third laser toward the first laser, if the clearance value is too low to trigger the first laser, the third laser will necessarily be triggered earlier, due to the fact that the first laser and the third laser are at the same angle with the tower barrel on the side, and that the blade, when rotating, passes through the third laser before passing through the first laser.

Optionally, the verification described above may be performed when determining that the safety protection is triggered based on the minimum compensated clearance value, or, alternatively, it may be possible to determine directly, after obtaining the measured clearance value (or compensated clearance value) of each laser, whether the error between the measured clearance value (or compensated clearance value) of the first laser and the measured clearance value (or compensated clearance value) of the third laser is too large or not, and accordingly determine whether the comparison result is valid or not and whether the safety protection is activated or not.

In an optional specific implementation, after compensating the measured clearance value of each laser by the preset compensation formula and obtaining the compensated clearance value, it can be determined whether the difference between the compensated clearance value of the third laser and the compensated clearance value of the first laser is less than a preset error. If the difference between the compensated clearance value of the third laser and the compensated clearance value of the first laser is greater than the preset error, then it can be determined that the compensated clearance value of the first laser is an invalid measurement result, otherwise, the compensated clearance value of the first laser is considered valid.

By verifying the validity of the measured clearance value by the error between the third laser and the first laser, the inaccuracy of the monitoring results due to data abnormality can be avoid, and the accuracy of the clearance value can be improved.

According to the method for monitoring tower clearance in the embodiments of the present application, it is proposed to measure a distance to an obstacle by emitting N lasers at different fixed angles toward a blade tip plane, calculate a measured clearance value of each laser based on an obtained first distance measured by the laser, and compensate the measured clearance value of each laser by a preset compensation formula to obtain a compensated clearance value, and then compare a minimum compensated clearance value among the N lasers with a preset clearance threshold value, and provide safety protection for the wind turbine based on the comparison result. It is possible to compensate the measured clearance value based on the preset compensation formula to obtain a more accurate clearance value, thereby improving the accuracy of the clearance value, and addressing the technical problem in the related technologies of the insufficient accuracy of the clearance value measured by laser clearance monitoring.

Figure 14:
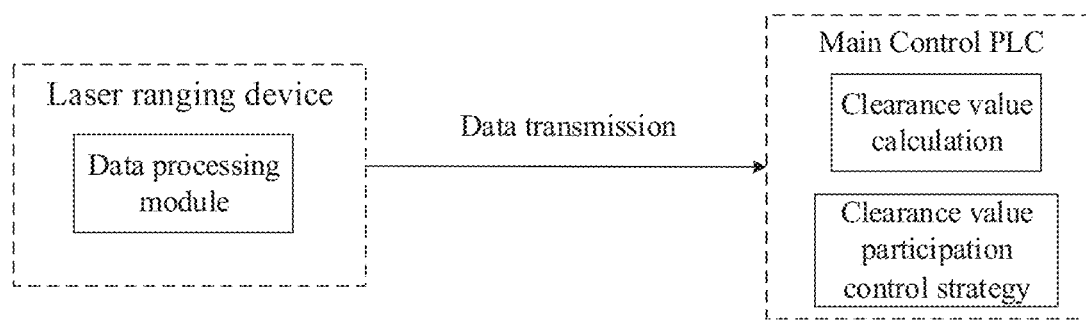
FIG. 14 is a schematic diagram of an application scenario of a method for monitoring tower clearance provided by an embodiment of the present application.

FIG. 14 is a schematic diagram of an application scenario of a method for monitoring tower clearance provided by an embodiment of the present application. With reference to FIG. 14, data transmission can be carried out between the laser ranging device and the master programmable logic controller (PLC), and the communication method can be a real-time field bus communication, such as Profibus DP (for example, the frequency can be 50 HZ), etc., which can be consistent with a refresh cycle of the program of the wind turbine. In the application scenario of FIG. 14, the functions of the method for monitoring tower clearance can be divided into three modules, which are:

(1) the data processing module set in the laser ranging device. The data processing module can execute the following main functions of data processing by running the program, including: providing a heartbeat signal of the device, a data validity signal, beam ranging values, etc., and sending the signals and values to the main control PLC through fixed formats.

(2) the clearance value calculation module set in the main control PLC. The main function of the clearance value calculation module is to calculate the tower clearance value from the range data of the laser returning to the blade through the clearance and provide the tower clearance value to the clearance value participation control strategy module.

(3) the clearance value participation control strategy module set in the main control PLC. The main function of the clearance value participation control strategy module is to use the clearance value of the wind turbine returned by the clearance value calculation module as a reference quantity, and perform corresponding control when the clearance value is lower than a certain threshold to increase the clearance value or perform the shutdown protection, so as to ensure the safe and stable operation of the wind turbine.

Figure 15:
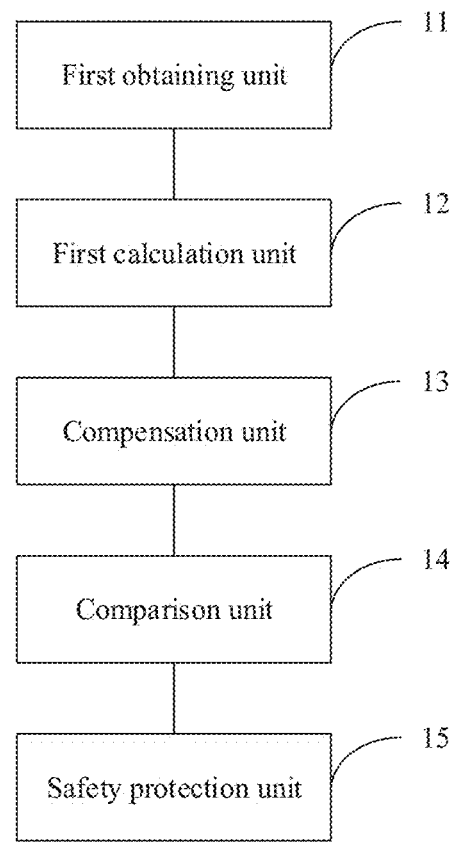
FIG. 15 is a schematic diagram of a structure of an apparatus for monitoring tower clearance provided by another embodiment of the present application.

FIG. 15 illustrates a schematic diagram of a structure of an apparatus for monitoring tower clearance provided by an embodiment of the present application. The apparatus for monitoring tower clearance provided by the embodiment of the present application may be used to implement the method for monitoring tower clearance provided by the embodiment of the present application. For the parts not described in detail in the embodiment of the apparatus for monitoring tower clearance provided by the embodiment of the present application, reference can be made to the description in the embodiment of the method for monitoring tower clearance provided by the embodiment of the present application.

As shown in FIG. 15, the apparatus for monitoring tower clearance provided by the embodiment of the present application includes a first obtaining unit 11, a first calculation unit 12, a compensation unit 13, a comparison unit 14, and a safety protection unit 15.

The first obtaining unit 11 may be configured to obtain a distance to an obstacle measured by a laser ranging device. The laser ranging device is mounted eccentrically at a bottom of a nacelle of a wind turbine, and the laser ranging device is configured to emit N lasers at different fixed angles toward a blade tip plane, and measure the distance to the obstacle by the lasers to obtain a first distance measured by each laser, where N is a positive integer greater than one.

The first calculation unit 12 may be configured to calculate a measured clearance value of each laser based on the first distance of the laser.

The compensation unit 13 may be configured to compensate the measured clearance value of each laser by a preset compensation formula to obtain a compensated clearance value of the laser.

The comparison unit 14 may be configured to compare a minimum compensated clearance value among the N lasers with a preset clearance threshold.

The safety protection unit 15 may be configured to perform safety protection for the wind turbine based on a comparison result.

Optionally, the apparatus may further include:

a module establishing unit configured to establish a dynamics model of the wind turbine before compensating the measured clearance value of each laser by the preset compensation formula to obtain the compensated clearance value of the laser;

a simulation unit configured to simulate blade states of a blade of the wind turbine under different wind conditions based on the dynamics model;

a second calculation unit configured to calculate blade tip clearance values under different blade states and the measured clearance values obtained when the lasers are emitted at different angles toward different positions of the blade under corresponding blade states;

an establishing unit configured to establish the preset compensation formula corresponding to the lasers at different angles based on the measured clearance values and the blade tip clearance values, wherein the preset compensation formula is used for calculating the blade tip clearance values for the lasers at corresponding angles based on the measured clearance values, the blade tip clearance values being used as the compensated clearance values.

Optionally, the N lasers may include a first laser and a second laser, the first laser and the second laser may be emitted in a vertical direction at a front of the wind turbine and emitted in a tilt direction at a side of the wind turbine, and titled angles of the first laser and the second laser at the side of the wind turbine are different.

Optionally, the first calculation unit 12 may further include:

a first calculation subunit configured to calculate an uncorrected clearance value of each laser based on the first distance of the laser and the tilted angle of the laser at the side of the wind turbine, wherein the uncorrected clearance value is a distance difference between a projection of a mounting position of the laser ranging device and a projection of a position where the laser is obstructed on the blade tip plane;

a second calculation subunit configured to subtract a second distance from the uncorrected clearance value and add a third distance to obtain the measured clearance value, wherein the second distance is a distance between the mounting position of the laser ranging device in the blade tip plane and a circle center of the tower barrel, and the third distance is a radius of a cross-section of the tower barrel in the blade tip plane.

Optionally, for the first laser, the first calculation subunit may include a third calculation subunit configured to multiply the first distance of the first laser with a sine value of the tilted angle of the first laser at the side of the wind turbine to obtain the uncorrected clearance value of the first laser.

Optionally, the N lasers may further include a third laser, the third laser is emitted in a tilt direction at the front of the wind turbine, and has a same tilted angle as the first laser at the side of the wind turbine.

Optionally, for the third laser, the first calculation subunit may include a fourth calculation subunit configured to calculate the uncorrected clearance value of the third laser based on the first distance of the third laser, a length of a blade of the wind turbine, the tilted angle of the third laser at the side of the wind turbine, and a projected angle of an angle between the first laser and the third laser at the front of the wind turbine.

Optionally, a blade of the wind turbine may be rotated in a direction from the third laser toward the first laser, and accordingly, the apparatus may further include:

- a determination unit configured to determine whether a difference between the compensated clearance value of the third laser and the compensated clearance value of the first laser is less than a preset error, after compensating the measured clearance value of each laser by the preset compensation formula to obtain the compensated clearance value of the laser;
- a first determination unit configured to determine that the compensated clearance value of the first laser is an invalid measurement result under a condition that the difference between the compensated clearance value of the third laser and the compensated clearance value of the first laser is greater than the preset error.

Optionally, the preset clearance threshold may include a shutdown threshold and a pitch threshold, the shutdown threshold is less than the pitch threshold, and accordingly the safety protection unit 15 may include:

- a first control subunit configured to control the wind turbine to shut down under a condition that the minimum compensated clearance value is less than the shutdown threshold;
- a second control subunit configured to control the wind turbine to pitch to increase a pitch angle of a blade of the wind turbine under a condition that the minimum compensated clearance value is less than the pitch threshold and greater than the shutdown threshold.

Optionally, under a condition that the minimum compensated clearance value is less than the pitch threshold, the apparatus may further include:

- a second obtaining unit configured to obtain an azimuth angle collected by an azimuth sensor configured for an impeller of the wind turbine, before performing safety protection for the wind turbine based on the comparison result;
- a second determination unit configured to determine that the comparison result is valid under a condition that the azimuth angle is in a preset azimuth angle interval; otherwise, determining that the comparison result is invalid.

The apparatus for monitoring tower clearance according to the embodiment of the application measures a distance to an obstacle by emitting N lasers at different fixed angles toward a blade tip plane, calculates a measured clearance value of each laser based on an obtained first distance measured by the laser, and compensates the measured clearance value of each laser by a preset compensation formula to obtain a compensated clearance value, and then compares a minimum compensated clearance value among the N lasers with a preset clearance threshold value, and provides safety protection for the wind turbine based on the comparison result. The apparatus can compensate the measured clearance value based on the preset compensation formula to obtain a more accurate clearance value, thereby improving the accuracy of the clearance value, and addressing the technical problem in the related technologies of the insufficient accuracy of the clearance value measured by laser clearance monitoring.

The embodiments of the application further provide a system for monitoring tower clearance, including a laser ranging device mounted eccentrically at a bottom of a nacelle of a wind turbine, and configured to emit N lasers at different fixed angles toward a blade tip plane, and measure a distance to an obstacle by the lasers to obtain a first distance measured by each laser, wherein N is a positive integer greater than one; an electronic device including the apparatus for monitoring tower clearance provided by the embodiment of the application.

Optionally, the N lasers may include a first laser and a second laser, the first laser and the second laser may be emitted in a vertical direction at a front of the wind turbine and emitted in a tilt direction at a side of the wind turbine, and titled angles of the first laser and the second laser at the side of the wind turbine are different.

Optionally, the N lasers may further include a third laser, and the third laser is emitted in a tilt direction at the front of the wind turbine, and has a same tilted angle as the first laser at the side of the wind turbine.

Figure 16:
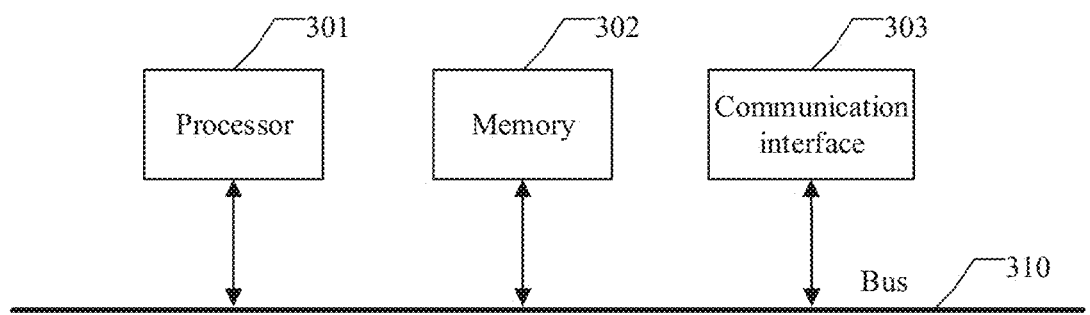
FIG. 16 is a schematic diagram of a structure of an electronic device provided by yet another embodiment of the present application.

FIG. 16 illustrates a schematic diagram of a hardware structure of an electronic device provided by an embodiment of the application.

The electronic device may include a processor 301 and a memory 302 storing program instructions.

Specifically, the above-described processor 301 may include a central processing unit (CPU), or an Application Specific Integrated Circuit (ASIC), or one or more integrated circuits that may be configured to implement embodiments of the application.

Memory 302 may include mass storage for data or instructions. By way of example and no limitation, the memory 302 may include a hard disk drive (HDD), a floppy disk drive, a flash memory, an optical disk, a magneto-optical disk, a magnetic tape, or a Universal Serial Bus (USB) drive or a combination of two or more of these. Where appropriate, the memory 302 may include removable or non-removable (or fixed) media. Where appropriate, the memory 302 may be internal or external to the integrated gateway disaster recovery device. In particular embodiments, the memory 302 is a non-volatile solid state memory.

In particular embodiments, the memory 302 includes a read-only memory (ROM). Where appropriate, the ROM may be a mask programmed ROM, a programmable ROM (PROM), an erasable PROM (EPROM), an electrically erasable PROM (EEPROM), an electrically rewritable ROM (EAROM), or a flash memory or a combination of two or more of these.

The memory may include a Read-Only Memory (ROM), a Random Access Memory (RAM), a magnetic disk storage medium device, an optical storage medium device, a flash memory device, an electrical, optical or any other physical/tangible memory storage device. Thus, the memory generally includes one or more tangible (non-transitory) readable storage media (for example, memory devices) encoded with software which includes computer-executable instructions, and the software, when executed (for example, by one or more processors), is operable to perform the operations described with reference to the method according to an aspect of the present application.

The processor 301 reads and executes program instructions stored in the memory 302 so as to implement any method for monitoring tower clearance in the above embodiments.

In an example, the electronic device may further include a communication interface 303 and a bus 310. As shown in FIG. 16, the processor 301, the memory 302, and the communication interface 303 are connected to and communicate with one another via the bus 310.

The communication interface 303 is mainly used to realize the communication between modules, apparatuses, units, and/or devices in the embodiments of the present application.

The bus 310 includes hardware, software, or both, and is configured to couple the components of the electronic device to one another. By way of example and no limitation, the bus may include an accelerated graphics port (AGP) or other graphics bus, an enhanced industry standard architecture (EISA) bus, a front-side bus (FSB), a hyper-transport (HT) interconnect, an industry standard architecture (ISA) bus, an infinite bandwidth interconnect, a low pin-count (LPC) bus, a memory bus, a microchannel architecture (MCA) bus, a peripheral component interconnect (PCI) bus, PCI-Express (PCI-X) bus, Serial Advanced Technology Attachment (SATA) bus, Video Electronics Standards Association Local (VLB) bus or other suitable bus or a combination of two or more of these. Where appropriate, bus 310 may include one or more buses. Although specific buses are described and illustrated in embodiments of the present application, the present application contemplates any suitable bus or interconnect.

In connection with the method for monitoring tower clearance in the above embodiments, embodiments of the present application may be implemented by providing a readable storage medium. The readable storage medium has program instructions stored thereon; the program instructions, when executed by a processor, implement any method for monitoring tower clearance in the above embodiments.

It is to be made clear that the present application is not limited to the particular configurations and processes described above and illustrated in the drawings. For the sake of brevity, detailed descriptions of known methods are omitted herein. In the above embodiments, a number of specific steps are described and illustrated as examples. However, the method process of the present application is not limited to the specific steps described and illustrated, and various changes, modifications and additions, or changes in the order of the steps, may be made by those skilled in the art after appreciating the spirit of the present application.

The functional blocks shown in the above-described structural block diagram may be implemented as hardware, software, firmware, or a combination thereof. When implemented in hardware, the functional block may be, for example, an electronic circuit, a specialized integrated circuit (ASIC), appropriate firmware, a plug-in, a function card, and the like. When implemented in software, an element of the present application is a program or code segment used to perform a desired task. The program or code segment may be stored in a machine-readable medium or transmitted over a transmission medium or communication link by means of a data signal carried in a carrier. "Machine-readable medium" may include any medium capable of storing or transmitting information. Examples of machine-readable media include electronic circuits, semiconductor memory devices, ROMs, flash memories, erasable ROMs (EROMs), floppy disks, CD-ROMs, optical disks, hard disks, fiber-optic media, radio frequency (RF) links, and the like. The code segments may be downloaded via a computer network such as the Internet, Intranet, etc.

It is also noted that the exemplary embodiments referred to in the present application describe some methods or systems based on a series of steps or devices. However, the present application is not limited to the order of the steps mentioned above, i.e., the steps may be performed in the order mentioned in the embodiments, or in a different order other than that in the embodiments, or several steps may be performed simultaneously.

Various aspects of the present application are described above with reference to flowcharts and/or block diagrams of methods, apparatuses (systems) and program products according to embodiments of the present application. It should be understood that each box in the flowchart and/or block diagram and combinations of boxes in the flowchart and/or block diagram may be implemented by program instructions. These program instructions may be provided to a processor of a general-purpose computer, a special-purpose computer, or other programmable data processing device to produce a machine such that these instructions, when executed via the processor of the computer or other programmable data processing device, enable the implementation of the function/action specified in one or more boxes of the flowchart and/or the block diagram. Such a processor may be, but not limited to, a general purpose processor, a specialized processor, a special application processor, or a field programmable logic circuit. It is also understood that each of the boxes in the block diagram and/or flowchart, as well as combinations of the boxes in the block diagram and/or flowchart, may also be implemented by specialized hardware that performs the specified function or action, or may be implemented by a combination of specialized hardware and computer instructions.

The foregoing is only a specific implementation of the present application, and it can be clearly understood by those skilled in the art that, for the convenience and conciseness of the description, specific working processes of the above-described systems, modules, and units can be known by referring to the corresponding processes in the foregoing method embodiments, and will not be repeated herein. It should be understood that the protection scope of the present application is not limited to the description, and any person skilled in the art may readily think of various equivalent modifications or substitutions within the scope of the technology disclosed in the present application, which shall be covered by the protection scope of the present application.

What is claimed is:

1. A method for monitoring tower clearance, comprising:
    emitting, by a laser ranging device, N lasers at different fixed angles toward a blade tip plane of a wind turbine, and measuring a distance to an obstacle by the lasers to obtain a first distance measured by each laser, wherein the laser ranging device is mounted eccentrically at a bottom of a nacelle of the wind turbine, and N is a positive integer greater than one;
    calculating a measured clearance value of each laser based on the first distance of the laser;
    compensating the measured clearance value of each laser by a preset compensation formula to obtain a compensated clearance value of the laser;
    comparing a minimum compensated clearance value among the N lasers with a preset clearance threshold; and
    controlling the wind turbine to shut down or pitch based on a comparison result.

2. The method according to claim 1, wherein, before compensating the measured clearance value of each laser by the preset compensation formula to obtain the compensated clearance value of the laser, the method further comprises:
    establishing a dynamics model of the wind turbine;
    simulating blade states of a blade of the wind turbine under different wind conditions based on the dynamics model;
    calculating blade tip clearance values under different blade states and the measured clearance values obtained when the lasers are emitted at different angles toward different positions of the blade under corresponding blade states;
    establishing the preset compensation formula corresponding to the lasers at different angles based on the measured clearance values and the blade tip clearance values, wherein the preset compensation formula is used for calculating the blade tip clearance values for the lasers at corresponding angles based on the measured clearance values, the blade tip clearance values being used as the compensated clearance values.

3. The method according to claim 1, wherein the N lasers comprise a first laser and a second laser, the first laser and the second laser are emitted in a vertical direction at a front of the wind turbine and emitted in a tilt direction at a side of the wind turbine, and titled angles of the first laser and the second laser at the side of the wind turbine are different.

4. The method according to claim 3, wherein the calculating the measured clearance value of each laser based on the first distance of the laser comprises:
    calculating an uncorrected clearance value of each laser based on the first distance of the laser and the tilted angle of the laser at the side of the wind turbine, wherein the uncorrected clearance value is a distance difference between a projection of a mounting position of the laser ranging device and a projection of a position where the laser is obstructed on the blade tip plane;
    subtracting a second distance from the uncorrected clearance value and adding a third distance to obtain the measured clearance value, wherein the second distance is a distance between the mounting position of the laser ranging device in the blade tip plane and a circle center of the tower barrel, and the third distance is a radius of a cross-section of the tower barrel in the blade tip plane.

5. The method according to claim 4, wherein, for the first laser, the calculating the uncorrected clearance value of each laser based on the first distance of the laser and the tilted angle of the laser at the side of the wind turbine comprises:
    multiplying the first distance of the first laser with a sine value of the tilted angle of the first laser at the side of the wind turbine to obtain the uncorrected clearance value of the first laser.

6. The method according to claim 4, wherein the N lasers further comprise a third laser, the third laser is emitted in a tilt direction at the front of the wind turbine, and has a same tilted angle as the first laser at the side of the wind turbine.

7. The method according to claim 6, wherein, for the third laser, the calculating the uncorrected clearance value of each laser based on the first distance of the laser and the tilted angle of the laser at the side of the wind turbine comprises:
    calculating the uncorrected clearance value of the third laser based on the first distance of the third laser, a length of a blade of the wind turbine, the tilted angle of the third laser at the side of the wind turbine, and a projected angle of an angle between the first laser and the third laser at the front of the wind turbine.

8. The method according to claim 6, wherein a blade of the wind turbine is rotated in a direction from the third laser toward the first laser, and after compensating the measured clearance value of each laser by the preset compensation formula to obtain the compensated clearance value of the laser, the method further comprises:
    determining whether a difference between the compensated clearance value of the third laser and the compensated clearance value of the first laser is less than a preset error;
    determining that the compensated clearance value of the first laser is an invalid measurement result under a condition that the difference between the compensated clearance value of the third laser and the compensated clearance value of the first laser is greater than the preset error.

9. The method according to claim 1, wherein the preset clearance threshold comprises a shutdown threshold and a pitch threshold, the shutdown threshold is less than the pitch threshold, and the controlling the wind turbine to shut down or pitch based on the comparison result comprises:
    controlling the wind turbine to shut down under a condition that the minimum compensated clearance value is less than the shutdown threshold;
    controlling the wind turbine to pitch to increase a pitch angle of a blade of the wind turbine under a condition that the minimum compensated clearance value is less than the pitch threshold and greater than the shutdown threshold.

10. The method according to claim 9, wherein under a condition that the minimum compensated clearance value is less than the pitch threshold, before controlling the wind turbine to shut down or pitch based on the comparison result, the method further comprises:
    obtaining an azimuth angle collected by an azimuth sensor configured for an impeller of the wind turbine;
    determining that the comparison result is valid under a condition that the azimuth angle is in a preset azimuth angle interval; otherwise, determining that the comparison result is invalid.

11. A system for monitoring power clearance, comprising:
    a laser ranging device mounted eccentrically at a bottom of a nacelle of a wind turbine, and configured to emit N lasers at different fixed angles toward a blade tip plane, and measure a distance to an obstacle by the lasers to obtain a first distance measured by each laser, wherein N is a positive integer greater than one; and
    an electronic device including a processor, and a memory storing program instructions, wherein the processor, when executing the program instructions, implements operations comprising:
    calculating a measured clearance value of each laser based on the first distance of the laser;
    compensating the measured clearance value of each laser by a preset compensation formula to obtain a compensated clearance value of the laser;
    comparing a minimum compensated clearance value among the N lasers with a preset clearance threshold; and
    controlling the wind turbine to shut down or pitch based on a comparison result.

12. The system according to claim 11, wherein the N lasers comprise a first laser and a second laser, the first laser and the second laser are emitted in a vertical direction at a front of the wind turbine and emitted in a tilt direction at a side of the wind turbine, and titled angles of the first laser and the second laser at the side of the wind turbine are different.

13. The system according to claim 12, wherein the N lasers further comprise a third laser, the third laser is emitted in a tilt direction at the front of the wind turbine, and has a same tilted angle as the first laser at the side of the wind turbine.

\* \* \* \* \*